United States Patent [19]
Staelin

[11] Patent Number: 6,117,187
[45] Date of Patent: *Sep. 12, 2000

[54] AUTOMATIC GENERATION OF A SOFTWARE INSTALLATION PACKAGE

[75] Inventor: Carl H. Staelin, Palo Alto, Calif.

[73] Assignee: Hewlett-Packard Company, Palo Alto, Calif.

[*] Notice: This patent is subject to a terminal disclaimer.

[21] Appl. No.: 08/940,756

[22] Filed: Sep. 30, 1997

[51] Int. Cl.[7] ..................................................... G06F 9/445
[52] U.S. Cl. .................................................. 717/11; 717/1
[58] Field of Search ..................................... 395/712, 701, 395/702, 703; 709/203, 220, 221, 222, 223, 224; 713/1, 100; 707/200, 203, 204

[56] References Cited

U.S. PATENT DOCUMENTS

| | | | |
|---|---|---|---|
| 5,247,683 | 9/1993 | Holmes et al. | 709/221 |
| 5,361,360 | 11/1994 | Ishigami et al. | 395/712 |
| 5,367,686 | 11/1994 | Fisher et al. | 395/712 |
| 5,421,009 | 5/1995 | Platt | 709/221 |
| 5,473,772 | 12/1995 | Halliwell et al. | 395/712 |
| 5,493,682 | 2/1996 | Tyra et al. | 395/703 |
| 5,555,416 | 9/1996 | Owens et al. | 395/712 |
| 5,634,114 | 5/1997 | Shipley | 395/500 |
| 5,721,824 | 2/1998 | Taylor | 709/203 |
| 5,832,205 | 11/1998 | Kelly et al. | 714/53 |
| 5,835,777 | 11/1998 | Staelin | 395/712 |
| 5,860,012 | 1/1999 | Luu | 395/712 |

*Primary Examiner*—Kakali Chaki
*Attorney, Agent, or Firm*—Marc R. Mayer

[57] ABSTRACT

A method of automatically generating a software installation package. The method operates on an application program that has been ported to and debugged on a target computer system. A manifest is automatically generated, listing all application program files that must be installed on the target computer system. Then the method automatically determines which resources, in particular shared libraries, are needed by any of the listed files. Necessary filesets and subproducts are then automatically generated. Program files are then automatically assigned to the filesets and filesets are automatically assigned to the subproducts. The need for control scripts is automatically detected and control scripts are automatically generated. Then the installation package is generated by combining the listed files, filesets, subproducts, control scripts, the needed resources, and any related installation materials. The needed resources are determined by generating a dependency list, comparing it with existing software installation packages, and identifying any packages that contain needed shared libraries as needed resources.

18 Claims, 6 Drawing Sheets

AUTOMATIC GENERATION OF A SOFTWARE INSTALLATION PACKAGE

BACKGROUND OF THE INVENTION

1. Field of the Invention

The present invention relates generally to computer systems and more particularly to a method of automatically generating a software installation package that can be used to install an application program in a user's computer system.

2. Description of the Related Art

There has been a continuing need for a simple and easy way to install an application program in a user's computer system. At one time this was done manually. The user would obtain an application program, typically on diskettes or other magnetic media, and would manually copy the application files from the magnetic media into one or more directories in the user's computer system. After this was done, the user would manually configure the application. As applications acquired more capabilities and grew correspondingly more complex, this installation process became a time-consuming and error-prone ordeal that often ended in an inoperative system and extreme frustration on the part of the user.

Software publishers have devoted much effort to finding a way to make it easier for users to install application programs. These efforts have led to the development of installation packages that take over the installation process from the user. Such installation packages have been perfected to the point that now they can install an application program almost completely automatically, ensuring that the application will work as desired and relieving the user of this burdensome chore.

Creating an installation package that can reliably install an application program is not a trivial task. The installation package must include all the files of the application program, and these files must be properly configured for the target computer system. In addition, the installation package includes other materials such as data files, scripts, executable programs, or the like. These materials operate more or less automatically to carry out the installation of the application program files. Depending on the operating system and other characteristics of the computer system in which the application is to be installed, creating a new installation package generally requires creating some or all of such materials anew, and this in turn may involve such tasks as writing a new program or creating a complicated data file. The burden of creating these materials falls on the software engineer, who must devote many hours of meticulous effort to this task.

Software tools that can create portions of installation packages are known. However, such tools do not relieve the software engineer of the considerable effort of creating the complete package. For example, one such tool requires the software engineer to manually create an arcane and complicated configuration file specifying many of the details of the installation.

A mass-marketed application program may sell hundreds of thousands of copies and thereby generate sufficient revenue to justify the extensive effort required to produce a good installation package. But many applications, especially those created for use by engineers and others who use computer workstations in environments such as the UNIX® operating system are distributed singly or in only a few copies (UNIX is a registered trademark in the United States and other countries licensed exclusively through X/Open Company, Ltd.). It has not been economically justifiable to spend the time necessary to develop good installation packages for such applications. The result has been either that effort is expended out of all proportion to the value of the application, or that the installation package does not get developed at all, or that an inadequate package is prepared. None of these outcomes is satisfactory.

One part of developing an installation procedure for a new application is determining which files to install and where in a target computer system to install them. A script has been developed that attempts to do this by (1) saving a list of all files in the system prior to installation of the new application, (2) saving preselected configuration files prior to installation, (3) installing the new application, (4) saving a list of all files in the system after the installation, (5) saving the preselected configuration files after installation, and (6) comparing to make a list of added files and any configuration changes. This script does not account for any files that are modified during installation (except the preselected configuration files). Thus, although the script performs one step in the process of creating an installation package, most of the work must still be done manually by the software engineer.

One method was developed to automatically generate various parts of the software installation package, saving the software engineer a great deal of time and effort. In copending U.S. patent application Ser. No. 08/619,876, now U.S. Pat. No. 5,835,777 entitled "Method of Automatically Generating a Software Installation Package," assigned to the assignee of the present invention and incorporated herein by reference, there is described a method for automatically generating a manifest that lists all application program files which need to be installed, determining needed resources, providing installation materials, and generating the installation package. The method described requires however, that certain steps necessary to generate a software installation package be done manually.

From the foregoing it will be apparent that there is a need to automate the steps that are done manually in the method described in copending U.S. patent application Ser. No. 08/619,876, now U.S. Pat. No. 5,835,777 in order to further reduce software engineering effort and increase efficiency.

SUMMARY OF THE INVENTION

The present invention provides a method of automatically creating a new software installation package that can correctly install an application program on a target computer system. Using the method of the invention, a software engineer can more easily and quickly create the installation package than was possible in the past.

Briefly and in general terms, the method of the invention begins with a new application program. The application program may have been created by the same engineer who wishes to use the method of the invention to create an installation package, or it may have been created by others. Once the application has been ported to the target computer system and debugged so that it is operable on the target system, the invention is used to generate the installation package. This includes the steps of automatically generating a manifest that lists all application program files which need to be installed on the target system, automatically determining which resources are needed by those files, automatically generating filesets and subproducts, automatically assigning files to the filesets and filesets to the subproducts, automatically determining a need for control scripts, automatically generating the control scripts, and generating the installation package by combining the listed files, any needed resources, the filesets, the subproducts, and the control scripts.

The step of determining which resources are needed preferably includes several substeps. The first substep is automatically generating a dependency list of any shared libraries referenced by any of the listed application program files. The next substep is automatically determining which of these shared libraries is already present in a preexisting software installation package. Finally, if any shared libraries are included in one or more preexisting software installation packages, then such preexisting packages are identified as needed resources.

The step of automatically detecting the need for control scripts also preferably includes several substeps. The first substep is automatically detecting the need for an add-new-configuration-file control script. The next substep is automatically detecting the need for an add-new-user control script. A third substep is automatically detecting the need for an add-new-group control script. A final substep is automatically detecting the need for an add-pathname-elements control script. Additional substeps may also be included to automatically detect the need for additional control scripts beyond those listed here.

Optionally, a cross-reference to any listed shared library that is not included in any of said preexisting installation packages is also included in the software installation program.

The new software installation package is typically distributed by recording on magnetic media, such as tape or diskettes or by imprinting the data in optical media, such as CD-rom or DVD. The magnetic or optical media can then be reproduced and distributed to users as desired. Alternatively, the package may be stored in a central location such as the hard disk of a network server so that the application program can be installed on any other computer having access to the central location.

The step of generating the manifest preferably includes saving a new timestamp, installing the application program in a testbed computer, and generating a list of all files in the testbed computer system having a timestamp more recent than the saved timestamp. This will ensure that all necessary files are identified. In one embodiment any file of a kind that has been previously determined to be spurious is excluded. The software engineer may review the list to delete any other spurious files that may have crept in. In another embodiment only files in certain preselected directory trees are considered.

Other aspects and advantages of the invention will become apparent from the following detailed description, taken in conjunction with the accompanying drawings, illustrating by way of example the principles of the invention.

DESCRIPTION OF THE PREFERRED EMBODIMENT

As shown in the drawings for purposes of illustration, the invention provides a method of automatically creating a new software installation package that is used to install an application program in a target computer. Software engineers have had to create such installation packages manually, a procedure that has required increasingly large amounts of effort as application programs have grown larger and more complex.

In accordance with the invention, when a new application program has been ported to a target computer system and debugged, the method of the invention automatically generates a manifest of files, a list of required shared libraries, appropriate filesets and subproducts, and necessary control scripts. The method of the invention also automatically assigns each file to a fileset and assigns each fileset to a subproduct. Using this information, an installation package is assembled. This method enables the software engineer to quickly and easily create an installation package that correctly installs even a very large and complex application program.

Figure 1:
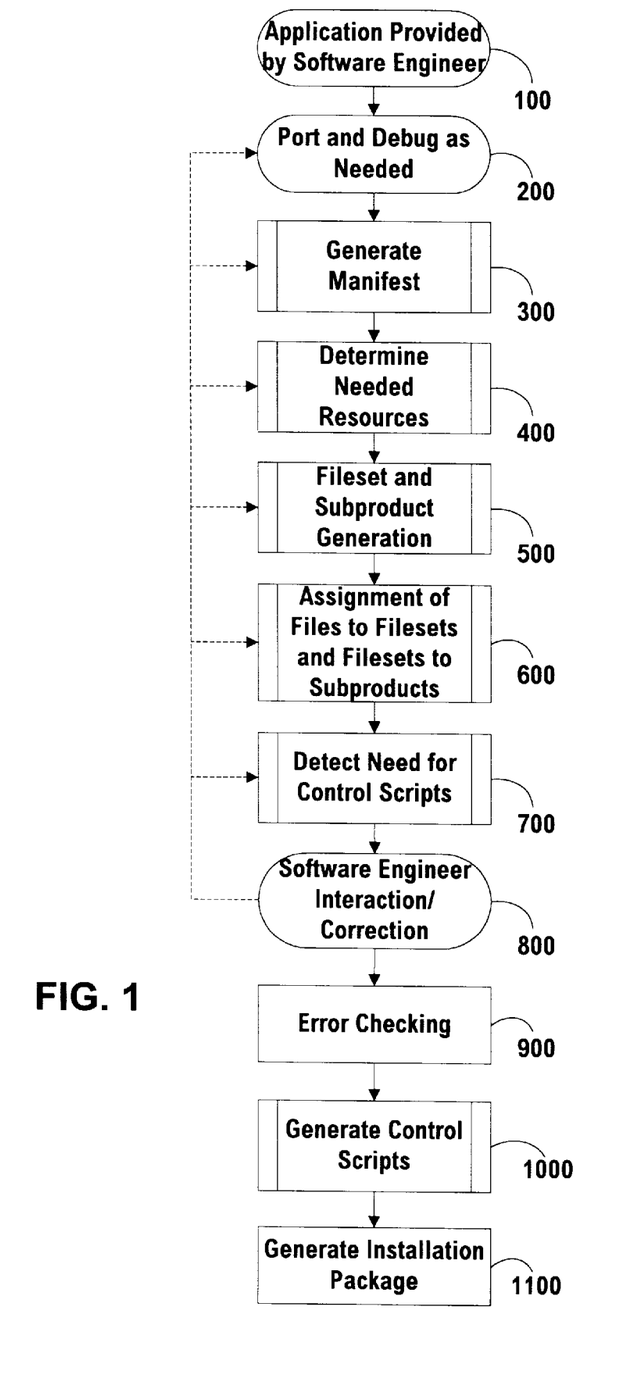
FIG. 1 is a flowchart depicting in general outline the method of the invention.

A method of automatically generating a software installation package for installing an application program on a target computer system according to the principles of the invention is depicted in flowchart form in FIG. 1. Initially the new application is provided, for example by a software engineer or by a team of such engineers (block 100), and is ported and debugged (block 200) so that it is operable on a target system. This has been satisfactorily done if the software is in such condition that the application program can be installed on a testbed computer. For example, in a computer system that uses the HP-UX operating system version 9.0, distributed by Hewlett-Packard Company, often the application is in satisfactory condition when the "MAKE CLEAN", "MAKE", and "MAKE INSTALL" commands build and install the application properly.

Starting with software that has been ported and debugged, the first step of the invention is to automatically generate a manifest that lists all files which must be installed on the target computer system for the application program to function correctly (block 300). The next step is to automatically determine which resources referenced by any of the listed files are needed on the target computer system for the application program to function correctly (block 400). Then, filesets and subproducts needed on the target computer system for the application program to function correctly are automatically generated (block 500).

Filesets and subproducts are part of a hierarch of software objects that make up the applications or operating systems on which Software Distributor-Unix (SD-UX) commands work. Filesets include all the files an control scripts that make up a product. The are the smallest selectable SD-UX software object. Subproducts are used to group logically related filesets within a product when the product contains several filesets.

Following automatic generation of the filesets and subproducts, each listed file is automatically assigned to an appropriate fileset and each of the filesets is automatically assigned to an appropriate subproduct (block 600). The next step is automatically detecting a need for certain control scripts that are necessary for installation on the target computer to function correctly (block 700). A control script, sometime known as a macro or batch file, is a list of commands that can be executed without user interaction. A software engineer then views the results of the steps which have already been performed according to the invention and provides information regarding any necessary corrections or additions to the invention (block 800). If the software engineer has directed that changes or additions are needed, the previous steps (block 200 through block 700) may be repeated as necessary. Otherwise, error checking is performed to ensure the previous steps have functioned properly (block 900). Next, the control scripts necessary for installation on the target computer to function correctly are generated (block 1000). The last step is generating an installation package by combining the listed application program files, any needed resources, the filesets, the subproducts, and the control scripts (block 1100).

The step of generating the installation package typically includes recording the listed files and other subject matter on media, such as tape, floppy diskettes, CD-rom, and DVD, for distribution to a user of the target computer system. These files and other subject matter may also be placed in an accessible location on a computer system, for example the hard disk of a network server, that is in electrical communication with the target computer system. The target system can run the installation package directly from the server or it can download the installation package and then run the installation program locally.

Figure 2:
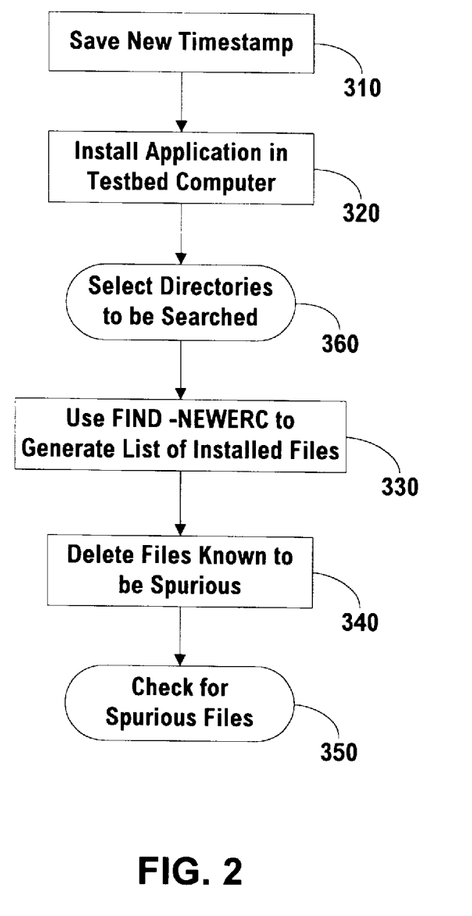
FIG. 2 is a flowchart depicting more details of a preferred embodiment of the "generate manifest" block of FIG. 1.

FIG. 2 illustrates an example of how to generate the manifest. A new timestamp is generated and saved (block 310). Then the application program is installed in a testbed computer system (block 320). In the HP-UX 9.0 environment this may be done by running the "MAKE" and "MAKE INSTALL" commands. Typically the testbed is a system similar to the target systems on which the installation package will later be run. Then all files in the testbed computer system having a timestamp more recent than the saved timestamp are listed (block 330). In the HP-UX 9.0 environment this may be done by using the "-NEWERC" option with the "FIND" command.

Depending on the operating system, it may be necessary to attach the new timestamp to each of the application program files prior to installing the application on the testbed computer. In the HP-UX 9.0 environment this is not necessary because the files will automatically receive new timestamps when they are copied during the installation process.

In one embodiment the file list is filtered to remove any file of a kind which has been predetermined as indicative of a spurious file (block 340). This may be done, for example, by searching for all files having a certain name or a certain character string in their name. Such files may have been generated or modified by system daemons. Such filtering can be done during the generation of the list, such that the unwanted files are never added to the list, or afterwards by deleting the unwanted files from the list. Optionally, the software engineer then manually reviews the file list to remove any other unwanted files (block 350).

In another embodiment, only files in predetermined directory trees are checked and, if their timestamps are newer than the saved timestamp, are placed on the list (block 360). This can shorten the time required to prepare the list if the software engineer knows ahead of time which directories need not be checked, for example because it is known that no new program files will be inserted in such directories.

The step of determining which resources are needed (block 400) preferably comprises automatically generating a dependency list that lists any shared libraries referenced by any of the listed object files, automatically determining which of the listed shared libraries are already included in one or more preexisting software installation packages, and identifying each such preexisting software installation package as a needed resource. An example of how these steps preferably are carried out is given in FIG. 3. An executable file is selected from the manifest (block 410). This file is then examined to determine which shared libraries it uses and a list of these libraries is prepared (block 420). In the HP-UX 9.0 environment this is conveniently done by means of the "CHATR" command. If there are more executable files the procedure is repeated, once for each executable file, and any shared libraries are added to the list (block 430).

Figure 3:
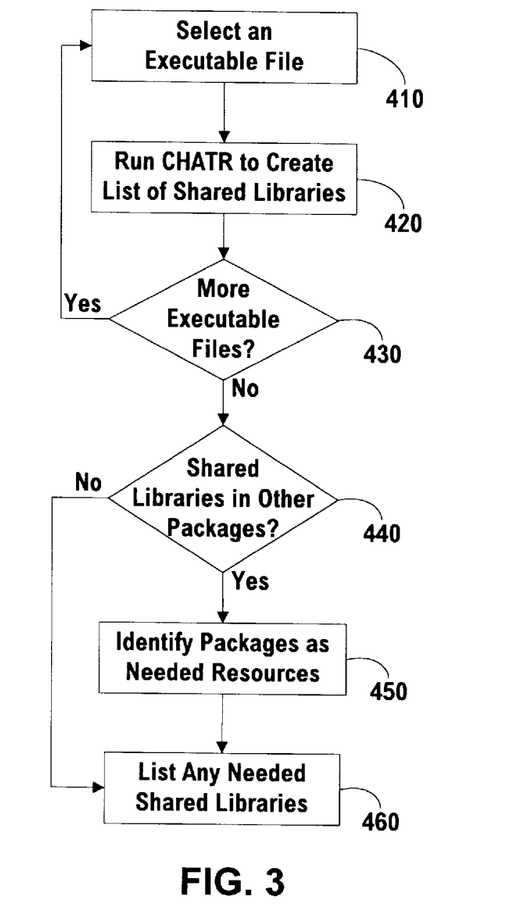
FIG. 3 is a flowchart depicting more details of a preferred embodiment of the "determine needed resources" block of FIG. 1.

The list of shared library dependencies is compared with those libraries already present in preexisting software installation packages (block 440). A list of any needed preexisting software installation packages results from this comparison (block 450) and is used in generating the new software installation package.

In one embodiment the new software installation package also includes a cross-reference to any shared libraries which are needed by the new package but which have not been found in any preexisting software installation packages (block 460).

The step of automatically generating filesets and subproducts (block 500) preferably includes the substeps of automatically comparing each file against a set of fileset rules, determining which filesets need to be generated, generating the needed filesets, comparing each fileset to a set of subproduct rules, determining which subproducts need to be generated, and generating the necessary subproducts.

One possible set of fileset rules includes the following individual rules:

```
{{\.sl$} 3 {-SHLIBS}}                      {{/man/de__DE\.iso} 0 {-GER-I-MAN}}
{{/lib[ /]*\.[0-9]$} 3 {-SHLIBS}}          {{/man/de__DE\.roman} 0 {-GER-R-MAN}}
{{/include/} 5 {-INC}}                     {{/man/de__DE} 0 {-GER-MAN}}
{{/man/man} 5 {-MAN}}                      {{/help/C/} 5 {-HELP}}
{{/man/fr__FR\.iso88591} 0 {-FRE-I-MAN}}   {{/help/fr__FR\.iso88591} 0 {-FRE-I-HELP}}
{{/man/fr__FR\.roman} 0 {-FRE-R-MAN}}      {{/help/fr__FR\.rohelp} 0 {-FRE-R-HELP}}
{{/man/fr__FR} 0 {-FRE-MAN}}               {{/help/fr__FR} 0 {-FRE-HELP}}
{{/man/fr__CA\.iso88591} 0 {-CFR-I-MAN}}   {{/help/fr__CA\.iso88591} 0 {-CFR-I-HELP}}
{{/man/fr__CA\.roman} 0 {-CFR-R-MAN}}      {{/help/fr__CA\.rohelp} 0 {-CFR-R-HELP}}
{{/man/fr__CA} 0 {-CFR-MAN}}               {{/help/fr__CA} 0 {-CFR-HELP}}
{{/help/de__DE\.iso} 0 {-GER-I-HELP}}      {{/msg/fr__CA\.roman} 0 {-CFR-R-MSG}}
{{/help/de__DE\.rohelp} 0 {-GER-R-HELP}}   {{/msg/fr__CA} 0 {-CFR-MSG}}
{{/help/de__DE} 0 {-GER-HELP}}             {{/msg/de__DE\.iso} 0 {-GER-I-MSG}}
{{/msg/C} 5 {-MSG}}                        {{/msg/de__DE\.roman} 0 {-GER-R-MSG}}
{{/msg/fr__FR\.iso88591} 0 {-FRE-I-MSG}}   {{/msg/de__DE} 0 {-GER-MSG}}
{{/msg/fr__FR\.roman} 0 {-FRE-R-MSG}}
{{/msg/fr__FR} 0 {-FRE-MSG}}
{{/msg/fr__CA\.iso88591} 0 {-CFR-I-MSG}}
```

Each of these rules is composed of three fields, the regexp, threshold and the name of the rule. The regexp is a regular expression used to match against filenames. The threshold is a minimum number of files which need to match the pattern defined by the regexp before the fileset is created. The name field, defines a string that is appended to the product name to create the fileset name.

It is understood that these rules serve only as an example of the set of fileset rules, and that numerous other forms of fileset rules may be substituted for the listed fileset rules. Alternatively, the set of fileset rules may include fileset rules in addition to the above-listed fileset rules, a subset of the above-listed fileset rules, or some combination thereof.

Similarly, one possible set of subproduct rules includes the following individual rules:

```
{{-RUN$} {Runtime}}              {{^[^-]*-MAN$} {Manuals}}
{{-MIN$} {Runtime}}              {{-...-MAN$} {ManualsByLang}}
{{-AUX$} {Runtime}}              {{-...-.-MAN$} {ManualsByLang}}
{{-SHLIBS$} {Runtime}}           {{^[^-]*-HELP$} {Help}}
{{-KRN$} {Runtime}}              {{-...-HELP$} {HelpByLang}}
{{-MIN$}                         {{-...-.-HELP$} {HelpByLang}}
{MinimumRuntime}}                {{^[^-]*-MSG$} {Messages}}
{{-SHLIBS$}                      {{-...-MSG$} {MessagesByLang}}
{MinimumRuntime}}                {{-...-.-MSG$} {MessagesByLang}}
{{-KRN$}
{MinimumRuntime}}
{{-NOTES$} {ReleaseNotes}}
{{-DEMO$} {Demonstration}}
{{-PRG$} {Development}}
{{-INC$} {Development}}
```

The subproduct rules are composed of two fields, a regexp and a subproduct name. In this case the regexp is used to match against fileset names. As with the fileset rules, these subproduct rules serve as an example of possible subproduct rules and numerous other subproduct rules may be substituted for these subproduct rules. Alternatively, the set of subproduct rules may include subproduct rules in addition to the above-listed subproduct rules, a subset of the above-listed subproduct rules, or some combination thereof.

Figure 4:
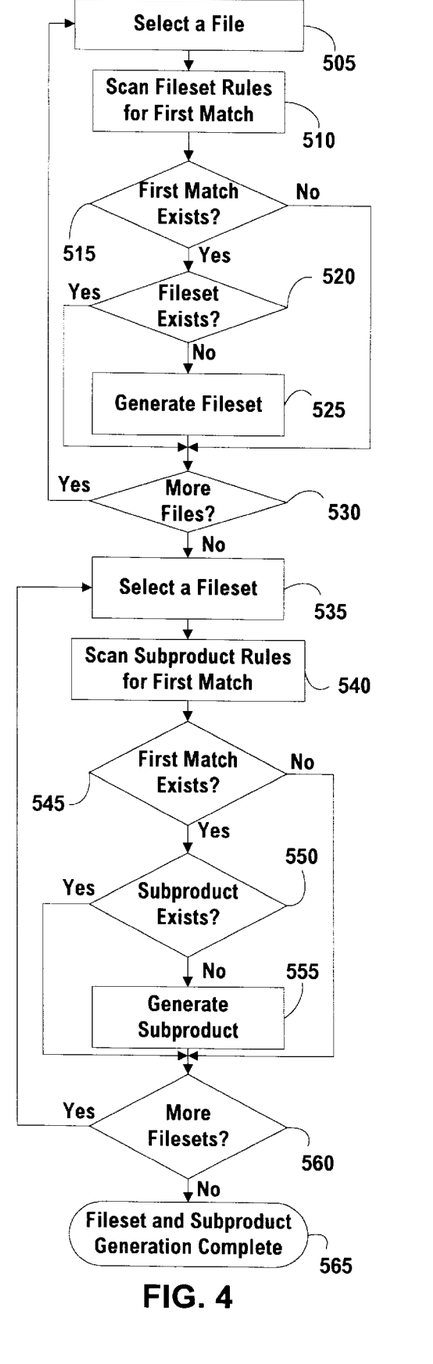
FIG. 4 is a flowchart depicting more details of a preferred embodiment of the "fileset and subproduct generation" block of FIG. 1.

An example of how these steps preferably are carried out is given in FIG. 4. First, a file is selected from the manifest (block 505). The fileset rules for the file are then scanned for a first match (block 510). If a first match does exists (block 515) and the fileset defined by the first match does not already exist (block 520) then the fileset defined by the first match is generated (block 525). Otherwise, the step of fileset generation (block 525) is bypassed. The next step is then to check if the manifest contains files which have not yet been checked (block 530). If it does, then the steps above (blocks 505 to 530) are repeated until the entire manifest has been checked.

In a similar fashion, a fileset is selected (block 535) from a list of all the filesets which were generated (block 525). The subproduct rules for the fileset are then scanned for a first match (block 540). If a first match exists (block 545) and the subproduct defined by the first match does not already exist (block 550) then the subproduct defined by the first match is generated (block 555). Otherwise, the step of subproduct generation (block 555) is bypassed. The next step is then to check for other filesets that have not yet been checked (block 560). If there are more filesets, then the steps above (blocks 535 to 560) are repeated until all the filesets have been checked. Once this has been completed, fileset and subproduct generation is complete (block 565).

Figure 5:
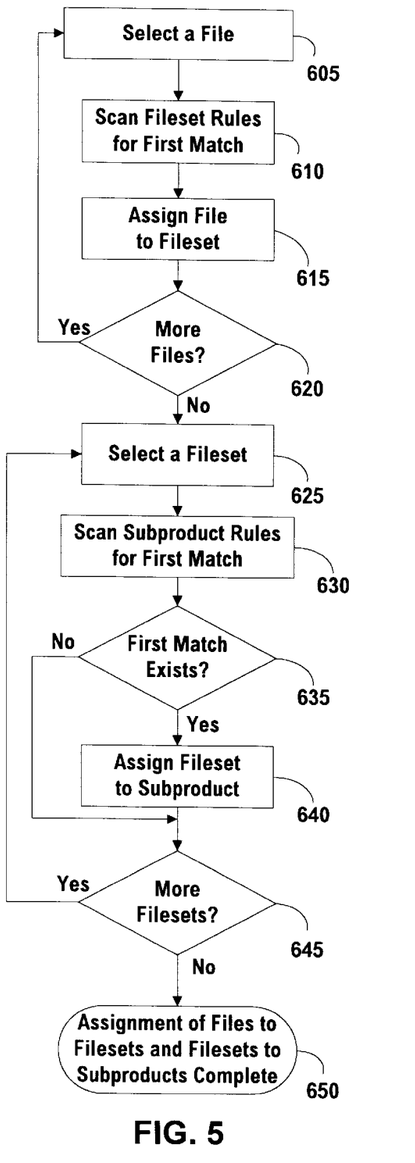
FIG. 5 is a flowchart depicting more details of a preferred embodiment of the "assignment of files to filesets and filesets to subproducts" block of FIG. 1.

Once the filesets and subproducts are generated, the next step is automatically assigning files to filesets and filesets to subproducts (block 600). An example of how this step is preferably accomplished is depicted in FIG. 5. First, a file from the manifest is selected (block 605). The fileset rules for the file are then scanned for a first match (block 610) and the file is then assigned to the fileset defined by the first match (block 615). The manifest is next checked for more files (block 620). If more files exist on the manifest, the above steps (blocks 605 through 620) are repeated. Once there are no more files on the manifest, a fileset is selected (block 625) from a list of all the filesets. The subproduct rules for the fileset are then scanned for a first match (block 630). If a first match exists (block 635) then the fileset is assigned to the subproduct defined by the first match (block 640). If more filesets are detected (block 645), then the steps starting with selecting a fileset (block 625) are repeated until all the filesets have been run through the process. Once no more filesets are detected, assignment of files to filesets and filesets to subproducts is complete (block 650).

The next step is the automatic detection of a need for control scripts in the installation package (block 700). There are numerous types of control scripts which may be necessary in any particular installation package. Some of these include:

1) newconfig—a control script for adding a new config files (/etc/);
2) user—a control script for adding a new user ID;
3) group—a control script for adding a new group ID;
4) pathfile—a control script for adding new elements to configuration path files;

5) crontab—a control script for modifying crontab, a file that controls the time that certain files are executed;
6) fragment—a control script that modifies config files;
7) kernel—a control script that adds or modifies kernel driver parameters;
8) obsolete—a control script that removes obsolete files from the system; and
9) daemon—a control script that starts system daemons.

The need for many of these control scripts may be automatically detected (block 700). For example, in a preferred embodiment of the invention, the need for newconfig, pathfile, user and group control scripts is automatically detected. One way the need for each of these control scripts may be detected is illustrated in FIGS. 6A, 6B, 6C and 6D respectively. It is noted that each of the methods illustrated in FIGS. 6A, 6B, 6C, and 6D begins at the same point, selecting a file (block 702) and ends at the same point, need for control script detection complete (block 714). It can be appreciated, therefore, that need for each control script can be detected simultaneously and in parallel. Alternatively, the need for each control script may be detected serially, in any order.

Figures 6A, 6B:
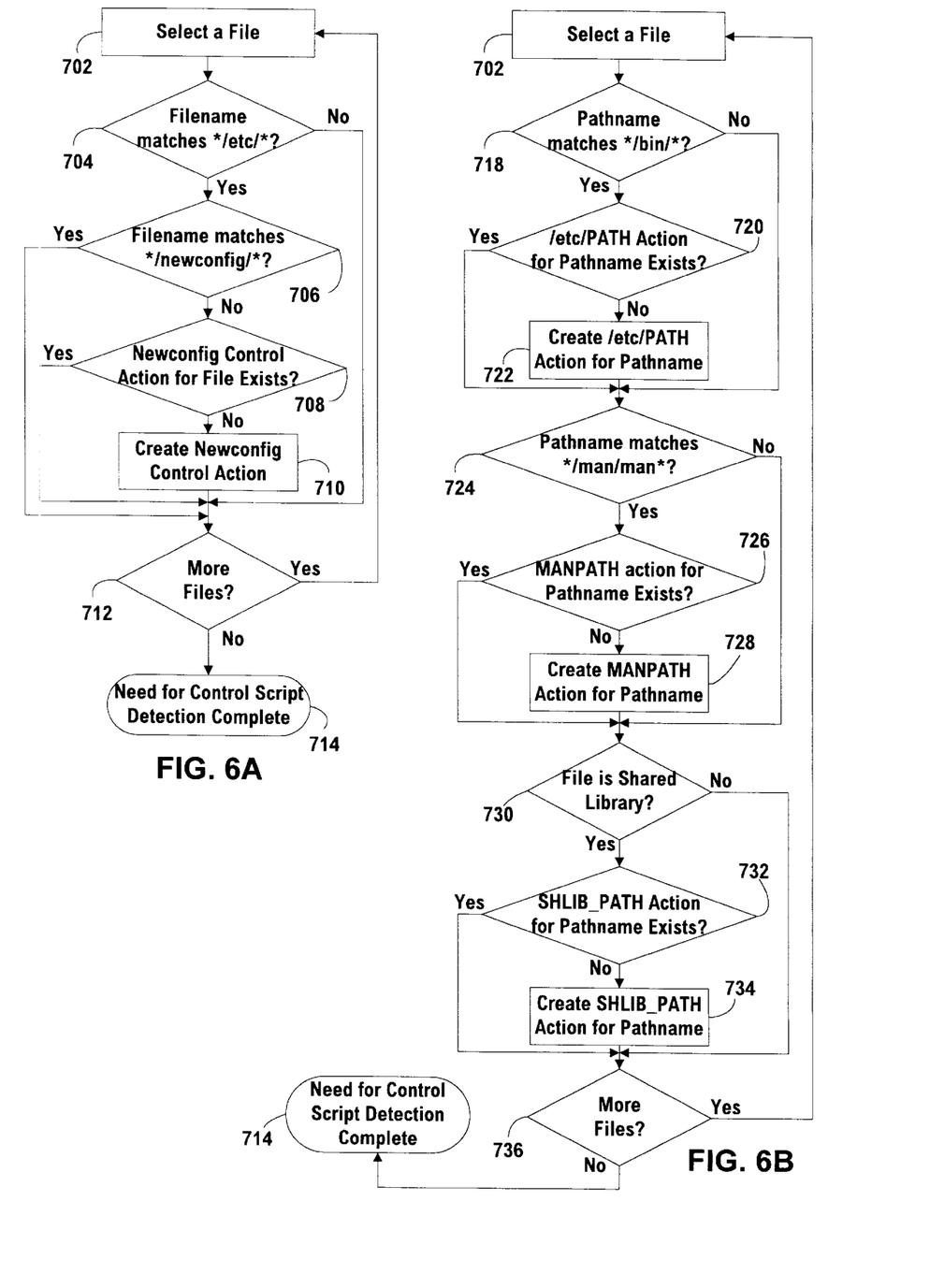
FIG. 6A is a flowchart depicting details of a first portion of a preferred embodiment of the "detect control scripts" block of FIG. 1.
FIG. 6B is a flowchart depicting details of a second portion of a preferred embodiment of the "detect control scripts" block of FIG. 1.

Detecting the need for a newconfig control script, as shown in FIG. 6A, begins by selecting a file from the file manifest (block 702). The filename of the selected file is then compared to the each of the config files, */etc/*, on the testbed computer (block 704). If a config file exists that matches the filename of the selected file, then this config file will need to be duplicated on the target computer using a newconfig control script. Next, the filename of the selected file is compared to each of the newconfig files, */newconfig/*, on the testbed computer (block 706) to determine if an appropriate newconfig control script already exists. If a newconfig control script does not exist, the next step is to determine if a newconfig control action for this file already exists (block 708). A control action is a type of indicator that an appropriate control script needs to be generated. If the newconfig control action for this file does not exist, then the newconfig control action for the file is created (block 710). Whether or not a newconfig control action was created, the manifest is next inspected to determine if it contains files which have not yet been checked (block 712). If it does, then the above described steps for automatically determining a need for a newconfig control scripts (blocks 702 through 712) are repeated until the every file on the manifest has been checked. Once this is done, the detection of the need for newconfig control scripts is compete (block 714).

Detecting the need for pathfile control scripts, as shown in FIG. 6B, actually involves detecting the need for three different types of pathfile control scripts, each of which can add one of three different types of elements to the configuration path files on the target computer. These elements are /etc/PATH, /etc/MANPATH, and /etc/SHLIB_PATH. The detection process begins by selecting a file from the file manifest (block 702). The pathname associated with the file is then compared to the each of the pathfile elements, */bin/*, on the testbed computer (block 718). If such a pathfile element exists that matches the pathname associated with the selected file, then the pathfile element will need to be duplicated on the target computer using a pathfile control script, /etc/PATH. Next, a check is done to determine if a /etc/PATH control action for the pathname associated with the file already exists (block 720). If the /etc/PATH control action for this pathname does not exist, then it is created (block 722).

Similarly, the pathname associated with the file is next compared to the each of the pathfile elements, */man/man*, on the testbed computer (block 724). If such a pathfile element exists that matches the pathname associated with the selected file, then the pathfile element will need to be duplicated on the target computer using a pathfile control script, /etc/MANPATH. Next, a check is done to determine if a /etc/MANPATH control action for the pathname associated with the file already exists (block 726). If the /etc/MANPATH control action for this pathname does not exist, then it is created (block 728).

Next, the file is inspected to determine if it is a shared library (block 730). If the file is a shared library, then its directory should be added to /etc/SHLIB_PATH using the pathfile control script. Next, a check is done to determine if a /etc/SHLIB_PATH control action for the pathname associated with the file already exists (block 732). If the /etc/SHLIB_PATH control action for this pathname does not exist, then it is created (block 734). Finally, the manifest is inspected to determine if it contains files which have not yet been checked (block 736). If it does, then the above described steps for automatically determining a need for a pathfile control scripts (blocks 702 through 736) are repeated until the every file on the manifest has been checked. Once this is done, the detection of the need for the pathfile control scripts is compete (block 714).

Figure 6C:
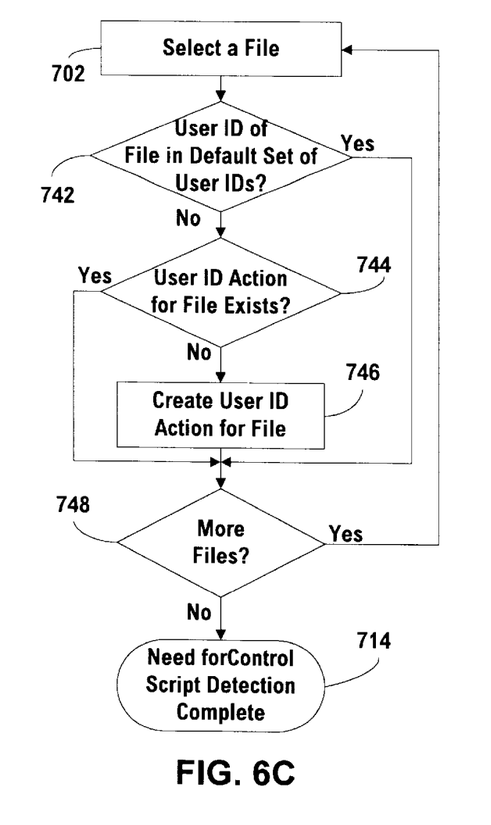
FIG. 6C is a flowchart depicting details of a third portion of a preferred embodiment of the "detect control scripts" block of FIG. 1.

Detecting the need for a user control script, as shown in FIG. 6C, begins by selecting a file from the file manifest (block 702). The user ID associated with the selected file is then compared to each of the user IDs within the default set of user IDs on the testbed computer (block 742). If the user ID associated with the file is not found in the default set of user IDs, then a new user ID must be added on the target computer using a user control script. Next, a check is done to determine if a user ID control action for this file already exists (block 744). If the user ID control action for this file does not exist, then the user ID control action for the file is created (block 746). The manifest is next inspected to determine if it contains files which have not yet been checked (block 748). If it does, then the above described steps for automatically determining a need for user control scripts (blocks 702 through 748) are repeated until the every file on the manifest has been checked. Once this is done, the detection of the need for user control scripts is compete (block 714).

Figure 6D:
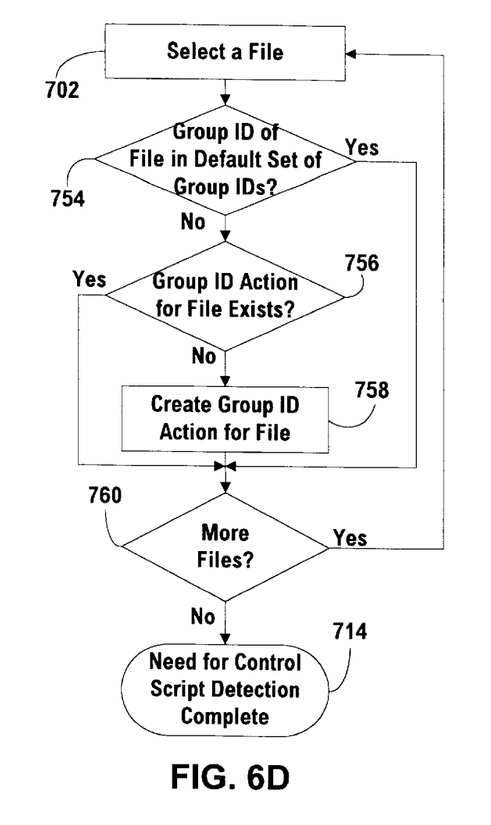
FIG. 6D is a flowchart depicting details of a fourth portion of a preferred embodiment of the "detect control scripts" block of FIG. 1.

Detecting the need for a group control script, as shown in FIG. 6D, begins by selecting a file from the file manifest (block 702). The group ID associated with the selected file is then compared to each of the group IDs within the default set of group IDs on the testbed computer (block 754). If the group ID associated with the file is not found in the default set of group IDs, then a new group ID must be added on the target computer using a group control script. Next, a check is done to determine if a group ID control action for this file already exists (block 756). If the group ID control action for this file does not exist, then the group ID control action for the file is created (block 758). The manifest is next inspected to determine if it contains files which have not yet been checked (block 760). If it does, then the above described steps for automatically determining a need for group control scripts (blocks 702 through 760) are repeated until the every file on the manifest has been checked. Once this is done, the detection of the need for group control scripts is compete (block 714).

Once all the needs for control scripts have been automatically detected, the software engineer is provided with information regarding the steps which have been automatically performed up to this point by the method according to the invention. After reviewing this information, the software engineer may elect to make modifications to the application which was originally provided. This may require that the step of porting and debugging the software be repeated (block 200). Alternatively, such changes may require that any or all of the previously completed steps be repeated. In these cases, the software engineer may direct which steps shall be repeated.

In a preferred embodiment of the invention, the software engineer may also decide that the installation package should include certain control scripts in addition to those control scripts, a need for which was automatically detected (block 700).

After the changes directed by the software engineer are made and any necessary steps are repeated, automatic error checking is performed (block 900). Errors that may have occurred during any of the previous steps are detected, and, in some cases, automatically corrected. One way in which errors can be checked is to inspect for common errors such as missing or invalid control script parameters.

The next step is to generate the control scripts (block 1000). This includes not only generating the control scripts, the need for which was detected automatically (block 700), but also the control scripts which the software engineer added (block 800). Control scripts include a preamble, a body and a postamble. The preamble and postamble are typically consistent between control scripts of a particular type. The body of the control script, however, typically varies from one control script to another, even between control scripts of the same type. A script fragment template is often used to guide the creation of the body of the control script fragment. The script fragment template provides a general outline of the body of the script, but contains blanks which need to be filled in with desired control script parameters to create control script body that functions in the desired manner.

Figure 7:
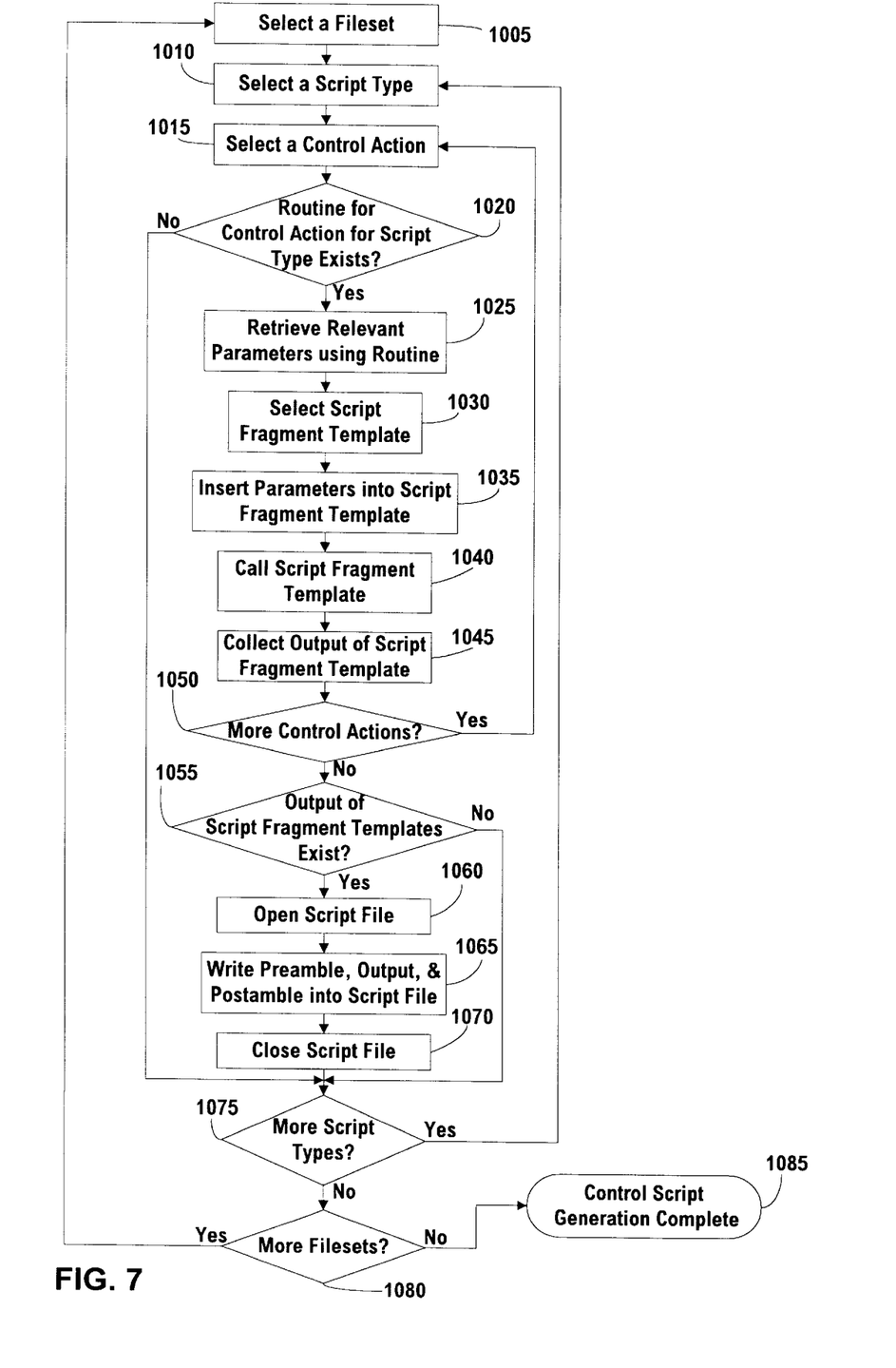
FIG. 7 is a flowchart depicting more details of a preferred embodiment of the "generate control scripts" block of FIG. 1.

FIG. 7 illustrates an example of how to generate the control scripts. First, a fileset is selected from the list of filesets previously generated (block 1005). Next, a specific type of control script is selected from a list of possible control scripts (block 1010). A control action is then selected from a list of all the control actions that direct the creation of the particular type of control script just selected (block 1015).

A routine corresponding to the control action for the type of control script selected is then sought (block 1020). If such a routine is found, it is run to retrieve relevant control script parameters (block 1025). Next a script fragment template corresponding to the previously selected type of control script is taken from a set of script fragment templates (block 1030). The relevant control script parameters that were retrieved are then inserted into the control script fragment template (block 1035), and the completed control script fragment template is called (block 1040). This results in a control script fragment template output. The control script fragment template output is then collected and saved for future use (block 1045). The list of the control actions that direct the creation of the particular type of control script selected is next inspected to determine if it contains control actions that have not yet been checked (block 1050). If it does, then the above described steps for creating a control script fragment template output (blocks 1015 through 1050) are repeated until the every control action on the list for that particular type of control script has been checked.

The next step is to see if any control script fragment template outputs exist (block 1055). If they do, then a script file is opened (block 1060), a script consisting of a preamble, the control script fragment template output, and the postamble are written into the script file (block 1065), and the script file is closed (block 1070). Next, the list of possible control scripts is checked to determine if additional types of control scripts need be generated within this particular fileset (block 1075). If more control scripts do need to be generated, the above described steps for generating the control scripts (blocks 1010 through 1075) are repeated until all the control scripts for a particular fileset are generated. Finally, the list of generated filesets is checked to determine if additional filesets need to have control scripts generated (block 1080). If more filesets do need to have control scripts generated, the above described steps for generating the control scripts (blocks 1005 through 1080) are repeated until all the filesets have had control scripts generated. Once this is completed, control script generation is complete (block 1085).

The final step is generating an installation package by combining the application program files listed on the manifest, any needed resources, the filesets, the subproducts, and the control scripts (block 1100).

The method of the invention is carried out automatically by computer. The software which carries out the steps of the invention may be recorded on magnetic media, such as tape or diskettes, or on optical media, such as CD-rom or DVD. Alternatively, the software which carries out the steps of the invention may be stored in computer memory, or otherwise made available for use by software engineers in creating installation programs.

From the foregoing it will be appreciated that the method of the invention provides a fast and easy way for a software engineer to create an installation program and thereby generate an installation package for an application program. The invention eliminates both the considerable effort and the frequent errors that resulted from attempts to create an installation program manually. Once created, the installation package may be used by computer system users to install the application program on their computer systems.

Although a specific embodiment of the invention has been described and illustrated, the invention is not to be limited to the specific forms or arrangements of parts so described and illustrated. The invention is limited only by the claims.

I claim:

1. A method of automatically generating a new software installation package for installing an application program on a target computer system, the application having been ported to the target system and debugged so that it is operable thereon the method comprising:

(a) providing a list of files of an application program which must be installed on the target computer system in order for the application program to function correctly;

(b) automatically generating filesets which must be installed on the target computer system in order for the application program to function correctly;

(c) automatically generating subproducts which must be installed on the target computer system in order for the application program to function correctly;

(d) automatically assigning each of the listed application program files to one the filesets;

(e) automatically assigning each of the filesets to one of the subproducts;

(f) automatically determining which resources needed by any of the listed application program files must be installed on the target computer system in order for the application program to function correctly;

(g) automatically generating a dependency list that lists any shared libraries needed by any of the listed application program files but not included in the application program;

(h) automatically determining which of the listed shared libraries are already included in one or more preexisting software installation packages;

(i) automatically identifying said preexisting software installation packages as needed resources; and (j) generating the new software installation package by associating the listed application program files, the filesets, subproducts, and the resources determined to be needed by the application program files.

2. A method as in claim 1 wherein step (j) additionally comprises associating a cross-reference to any listed shared library that is not included in any of said preexisting installation packages.

3. A method as in claim 1 and further comprising, after step (j), the step of placing the new software installation package in an accessible location on a computer system that is in communication with the target computer system.

4. A method as in claim 1 and further comprising, after step (j), the step of recording the new software installation package on magnetic media for distribution to a user of the target computer system.

5. A method as in claim 1 and further comprising, after step (j), the step of recording the new software installation package on optical media for distribution to a user of the target computer system.

6. A method as in claim 1 wherein step (a) comprises:
saving a new timestamp;
installing the application program in a testbed computer system; and
providing a list of files in the testbed computer system having a timestamp more recent than the saved timestamp.

7. A method as in claim 1 wherein step (a) comprises:
saving a new timestamp;
installing the application program in a testbed computer system; and
providing a list of files, except any file of a kind which has been predetermined as indicative of a spurious file, in the testbed computer system having a timestamp more recent than the saved timestamp.

8. A method as in claim 1 wherein step (a) comprises:
saving a new timestamp;
installing the application program in a testbed computer system; and
generating a list of all files in a predetermined directory tree of the testbed computer system having a timestamp more recent than the saved timestamp.

9. A method of automatically generating a new software installation package for installing an application program on a target computer system, the application having been ported to the target system and debugged so that it is operable thereon, the method comprising:

(a) generating a list of all files of the application program which must be installed on the target computer system in order for the application program to function correctly;

(b) automatically detecting the need for control scripts in the new software installation package in order for the application program to install to the target computer properly;

(c) automatically generating the control scripts; and (d) generating the new software installation package by associating the application program files, and the control scripts.

10. A method as in claim 9, additionally comprising before step (d):
automatically determining which resources needed by any of the listed files must be installed on the target computer system in order for the application program to function properly; and
wherein step (d) includes associating the resources determined to be needed by the application program files.

11. A method as in claim 10, wherein the step of automatically determining needed resources includes:
automatically generating a dependency list that lists any shared libraries needed by any of the listed files but not included in the application program,
automatically determining which of the listed shared libraries are already included in one or more preexisting software installation packages, and
automatically identifying said preexisting software installation packages as needed resources; and
wherein step (d) additionally comprises associating a cross-reference to any listed shared library that is not included in any of said preexisting installation packages.

12. A method as in claim 9 wherein step (b) comprises:
automatically detecting the need for an add-new-configuration-file control script;
automatically detecting the need for an add-new-user control script;
automatically detecting the need for an add-new-group control script; and
automatically detecting the need for an add-pathname-elements control script.

13. A method as in claim 9 wherein step (a) comprises:
saving a new timestamp;
installing the application program in a testbed computer system; and
generating a list of all files in a predetermined directory tree of the testbed computer system having a timestamp more recent than the saved timestamp.

14. A method of automatically generating a new software installation package for installing an application program on a target computer system, the application having been ported to the target system and debugged so that it is operable thereon, the method comprising:

(a) generating a list of all files of the application program which must be installed on the target computer system in order for the application program to function correctly;

(b) automatically generating filesets which must be installed on the target computer system in order for the application program to function correctly;

(c) automatically generating subproducts which must be installed on the target computer system in order for the application program to function correctly;

(d) automatically assigning each of the application program files to one of the filesets;

(e) automatically assigning each of the filesets to one of the subproducts;

(f) automatically detecting the need for control scripts in the new software installation package in order for the application program to install to the target computer properly;

(g) automatically generating the control scripts; and (h) generating the new software installation package by associating the application program files, the filesets, the subproducts, and the control scripts.

15. A method as in claim 14, additionally comprising before step (h):
   automatically determining which resources needed by any of the listed files must be installed on the target computer system in order for the application program to function properly; and
   wherein step (h) includes associating the resources determined to be needed by the application program files.

16. A method as in claim 15, wherein the step of automatically determining needed resources additionally includes:
   automatically generating a dependency list that lists any shared libraries needed by any of the listed files but not included in the application program,
   automatically determining which of the listed shared libraries are already included in one or more preexisting software installation packages, and
   automatically identifying said preexisting software installation packages as needed resources; and
   wherein step (h) additionally comprises associating a cross-reference to any listed shared library that is not included in any of said preexisting installation packages.

17. A method as in claim 14 wherein step (f) comprises:
   automatically detecting the need for an add-new-configuration-file control script;
   automatically detecting the need for an add-new-user control script;
   automatically detecting the need for an add-new-group control script; and
   automatically detecting the need for an add-pathname-elements control script.

18. A method as in claim 14 wherein step (a) comprises:
   saving a new timestamp;
   installing the application program in a testbed computer system; and
   generating a list of all files in a predetermined directory tree of the testbed computer system having a timestamp more recent than the saved timestamp.

* * * * *